Dec. 16, 1952        J. B. MERIAM        2,621,515

FLOW METERING DEVICE

Filed Jan. 25, 1947        2 SHEETS—SHEET 2

INVENTOR.
JOSEPH B. MERIAM,
BY
Justin W. Macklin
ATT'Y

Patented Dec. 16, 1952

2,621,515

UNITED STATES PATENT OFFICE 2,621,515

FLOW METERING DEVICE

Joseph E. Meriam, Lakewood, Ohio

Application January 25, 1947, Serial No. 724,387

8 Claims. (Cl. 73—202)

This invention relates to the measurement and control of fluid flow, and particularly it is concerned with determining the flow through orifices.

A primary object of the invention is to provide a means for accurately integrating the total flow of any fluid in any conduit.

An advantage of the present invention is that it is capable of use in the control of flow to accord with any desired relationship.

A more specific object is the provision of such a fluid flow metering means which shall be simple, efficient and easily used.

Still other objects include the construction of a single assembly for the attainment of effective and accurate measurement of fluid flow at various pressures and in a wide variety of sizes of conduits, and more specifically the measurement of flow through the wide variety of sizes of orifices.

Other objects will become apparent in the following description which relates to a preferred form or design of my metering apparatus illustrated in the accompanying drawings.

In carrying out my invention I connect my apparatus at the upstream side of an orifice in the main line flow, using a relatively very small orifice for drawing off a proportional quantity to be measured in an accurate volume flow meter.

The downstream side of the main line orifice is connected to a controlling mechanism, the effect of which is to allow a flow through the small orifice (meter) and which flow is only sufficient to maintain exactly the same pressure at the small orifice leading to the meter as the downstream pressure in the main line.

In all such measurements it is well known that $$Q = C\sqrt{hP}$$

Where the Q is the quantity or flow of gas or vapor, C is a constant based on emperical data, $h$ is differential (water column) pressure, and P is barometer plus the gauge.

The effect of variation in amount of flow through many sizes of orifice is governed by a great many factors.

According to established relationship of the well-known and much used Reynolds' factor of orifice flow reasonably accurate measurements can be made only within certain narrow limits of orifice size and variable flow.

In order to accomplish proportional measurement of main line flow by drawing off and metering a relatively exceedingly small part of the main line flow under varying conditions of size and pressure, it is essential (and heretofore very difficult, if not impossible, with previous devices) to maintain the constant C of the above formula "constant."

My device therefore includes essentially a controller for the pressure and flow through the minute orifice in the passage leading from the upstream side of the main line orifice to the matter.

The controller functions to permit flow through the metering orifice at exactly the same pressure as the downstream side of the main line meter.

Within certain limits, it would be possible to meter the flow from this small orifice by a direct connection with a manometer or like instrument, and to proportionally determine the flow in the main line. However, variations from ideal conditions, or conditions for which such a metering device must be designed and emperically tested, require the addition of some means for correcting according to the variation factors. In the present invention I have provided such a means which I refer to as a factor corrector, which comprises a shunt or by-pass around the meter itself and which automatically responds to the conditions in the main line with relation to the master metering orifice, and acts to vary the amount shunted around the meter (or drawn off from the flow to the meter) and in precise predetermined relation to the variations according to Reynolds' established factor computations.

I have found in practice that with my master metering device, the controller will effectively govern the pressure at the bleed orifice leading to the meter, and that for conditions of wide ranges of size, rate of flow, and pressures in the main line, the corrector will automatically and continuously function to maintain the amount of fluid passing through the measuring meter in a close relationship to ideal conditions for accurate measurement. Thus, the function of the corrector is to compensate for the variable factors of orifice flow.

A preferred embodiment of my invention is illustrated in the accompanying drawings to which the following description relates, in setting forth the novel features and functions of my master metering device.

In the drawings, Fig. 1 is a sectional view through the controller and variation factor corrector showing the pipe connections from the main flow line and to the meter.

To illustrate the main line flow conduit, I have shown somewhat diagrammatically a pipe 10 having a restricting member 11 providing a main line flow orifice $O_1$. The arrow indicating the direction of flow, and 12 and 14 designate the upstream and downstream pressure tap connections, respectively, positioned as is usual for such a measuring purpose adjacent to the main stream orifice $O_1$.

It is understood that this main flow line or conduit may range in size from very small to very large main line gas conduit, several inches to two feet or more in diameter. In fact, for the purpose of the present invention the diameter pressure and speed of flow of the main line may vary through exceedingly wide ranges, such, for example, as have required a wide variety of measuring instruments.

Also indicated diagrammatically and representative of any suitable size or diameter are the tubes or pipes 15 and 16 leading from the tap orifices 12 and 14 at the upstream and downstream side of the main orifice, and to the controller which will now be described.

Figure 1:
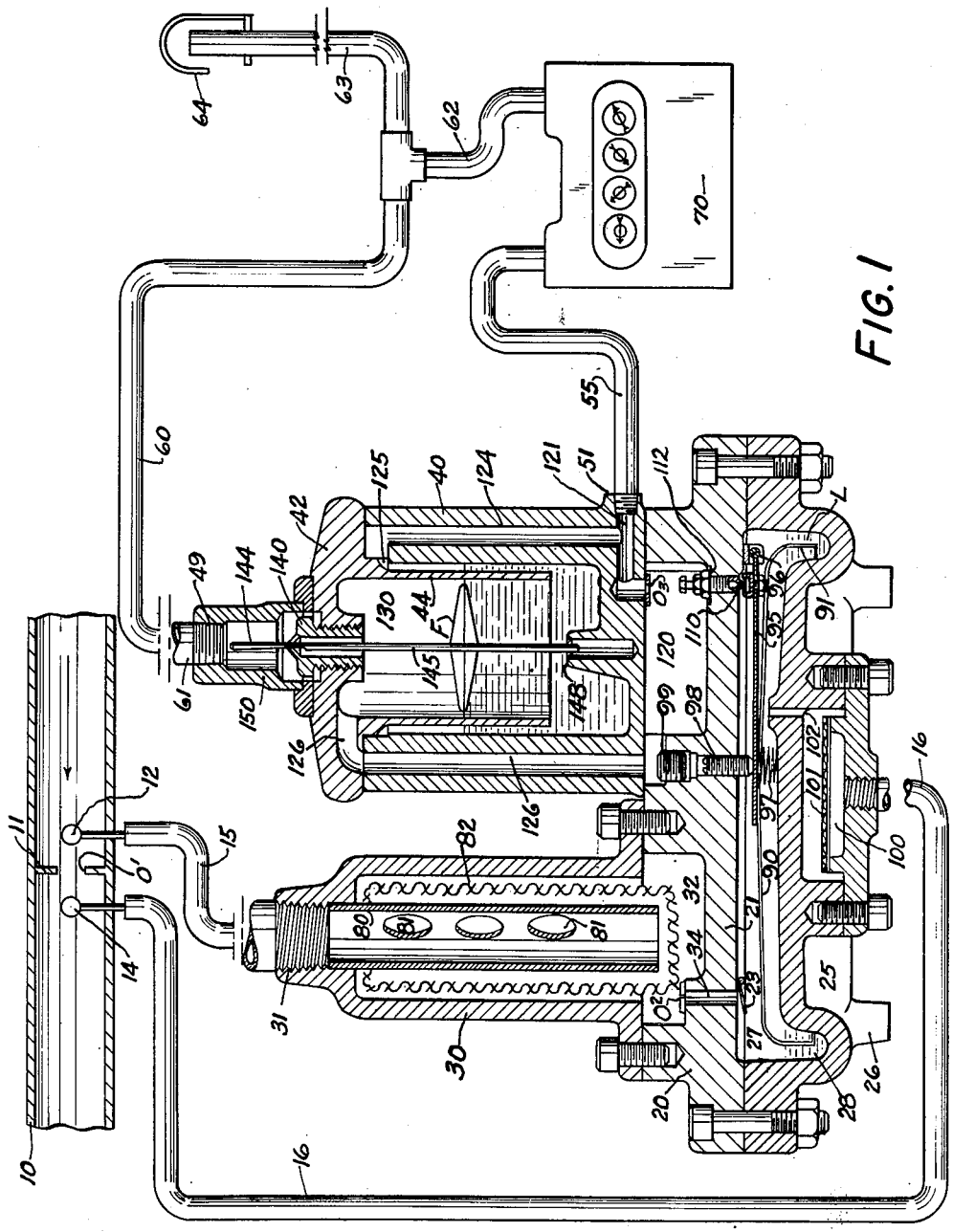
Figure 2:
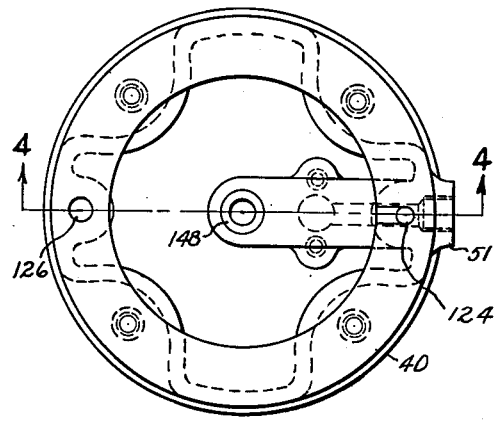
Fig. 2 is a plan view of the corrector float chamber member.
Figure 3:
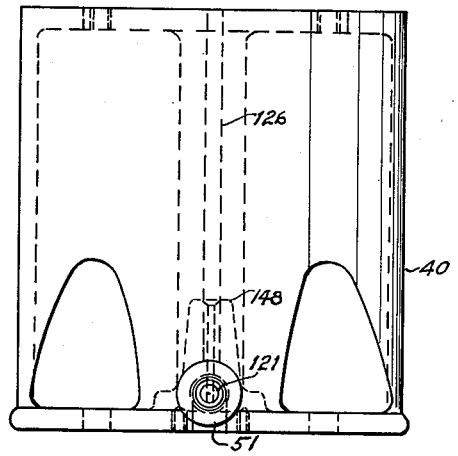
Fig. 3 is a side elevation of the same.

In the arrangement shown, a body plate 20 is bolted to a base member 25 shown as having suitable feet or projections 26 to rest on a level surface. Rising from the body member 20 at the left (of Fig. 1) is a chamber or housing 30 to which the passage 15 is connected as by threads indicated at 31.

Also rising from the body member 20 (at the right) is a float chamber housing 40 closed at the top by a cap member 42 having a depending cylindrical skirt 44, the function of which will later appear, and also providing for a mounting for a variable orifice control and connection 49 which leads to a shunt or exhaust line 60.

At the lower portion of the body member 40 is shown a connection 51 in which is fitted a tube 55 leading to the meter proper, designated 70. These tubes 55 and 60 and meter 70 are indicated diagrammatically and are not necessarily related in scale to the controller and corrector parts in this view.

In the arrangement shown the tube 15 leads from the upstream orifice 12 to the pipe connection 31, and thence to the inside of a perforated tube 80 rigidly mounted in the chamber member 30, and provided with openings 81 preferably of large size to permit free flow therethrough. The lower end of the tube also is shown as open. A filter cloth bag indicated at 82 loosely surrounding this tube is of sufficient area and suitable texture to permit such free flow that it affords no measurable retarding action on the gas or other fluid passing therethrough.

The chamber member 30 opens into a chamber 32 from which a passage 34 leads through the lower wall 21 of the body member into a chamber 27 formed principally in the base member 25.

At the entrance to the passage 34 is fitted an orifice member—preferably of sapphire or the like—and having a small opening $O_2$ of accurate predetermined dimension.

In practice and for a wide variety of uses I have chosen an orifice opening at $O_2$ of thirty thousandths of an inch in diameter (.030″).

Below the orifice 34 is a baffle plate 23 to disperse the stream flowing through the passage 34, and shown as rigidly mounted at the lower side of the wall 21.

The chamber 27 is substantially circular and an annular recess 28 is formed in the base member and filled to a predetermined level with a liquid such as oil, as indicated at L. A diaphragm member 90 has an annular flange portion 91 projecting downwardly into the oil ring L to effect a seal between the chambers above and below this member 90. At its middle portion of the diaphragm is attached a rigid arm 95 shown as connected near the perimeter of the diaphragm to the base member 20, by pivot mounting designated 96.

A balancing spring 97 beneath the central portion of the diaphragm 90 acts normally to counter-balance or exactly support the weight of the diaphragm and its arm with the flange 91 in the oil ring L, and acting to balance the diaphragm 90 so that it may move slightly in response to any change in pressure above and below the diaphragm.

The screw 98 is accessible through an opening above it and normally closed by a threaded plug 99, permitting adjustment and for locking the diaphragm against movement while transporting or shipping the device.

From the downstream side of the main orifice $O_1$ the intake 14 and its passage 16 lead to a chamber 100, which is divided by a filter 101 and from the upper portion of which leads a passage 102 to the underside of the diaphragm 90.

Thus, the diaphragm member 90, which is subjected to pressure from the upstream side of the main orifice $O_1$ on its upper side, and counterbalanced by pressure from the downstream side of the main orifice, has its position varied through very slight amount of movement, and acts to open and close the control valve 110.

This valve controls the passage of the gas or fluid to be metered. It may be of any suitable construction to permit a predetermined amount of leakage from the chamber above the diaphragm 90 as permitted by the increment of pressure below the diaphragm and which pressure corresponds to the downstream pressure at the tap 14. The amount of leakage is in a controlled ratio to that passing to the meter.

A flat surface carried by the support or arm 95 brought into contact with a cone point having an axial passage are the essential elements of the control valve 110.

Such a flat closure surface may be an accurately prepared surface of a tin projection carried on the arm 95 and adapted to rest against the minute annulus of the cone point valve seat. A preferred construction, however, is that shown in Fig. 5 in which the screw member 112 carries a cone-shaped jewel seat 115 having a passage registering with the passage 113. This seat may be of sapphire or other extremely hard wearing material held in place as indicated by a flange surrounding the conical side of the seat element.

The valve closure member 116 is preferably oil resistant and presents a flat surface to the lower face of the jewel seat 115. This closure member may be formed of any suitable material, but it is preferably a resilient disk carried by the head 117 of a screw member 118 firmly holding it to the arm 95.

The passage from the control valve 110 leads into the chamber 120 formed in the base member 20 beneath the floor of the housing member 40, from which leads a passage 121 connected to the pipe 55 leading to the meter 70. The entrance to the passage 121 is governed by a "corrector orifice" which may be another jeweled orifice of precise dimension mounted across the opening of the passage as indicated at $O_3$.

As stated, the corrector functions by shunting some of the fluid or gas around the meter. In other words the corrector draws off a portion of the flow from the control valve 110 under control of a highly responsive pressure actuated means which forms a very critical part of my present invention.

Various physical embodiments of such a corrector mechanism may be used, but the arrangement shown has been thoroughly tested and is the result of long and extensive investigation. It comprises essentially a float responsive to a manometer acting through minute changes of orifice opening to vary the amount of escape or by-passing of the meter.

The skirt or sleeve 44 projecting down into the chamber of the housing 40 divides a body of liquid so that the float F is supported on the column within the sleeve 44, and the height of this column may be varied by variation in pressure on the surface of the liquid outside of the sleeve 44.

The pressure on the liquid outside of the sleeve 44 is applied through the passage 124 leading upwardly through a boss formed in the housing 40 and connected at 125 with the space outside of the sleeve.

The pressure of gas, between the corrector orifice $O_3$ and the meter, acting on the liquid outside of the sleeve 44 tends to raise the column of liquid within the sleeve or skirt 44, i. e., in the space 139. This, however, is partially counteracted by pressure through a passage 126 leading from the chamber 120 to the interior of the sleeve 44 in the chamber 130 above the float F.

As stated, the by-passing effect is under the control of the float F by reason of a by-pass valve 140, i. e., the corrector valve, controlling the passage of gas from the chamber 130 to the pipe 60, which in turn communicate with the outside air.

The construction of the by-pass valve 140 is preferably that of a gradually tapered surface moving axially in a fixed orifice, the movement being effected by the raising and lowering of the float F.

Figures 4, 5, 6:
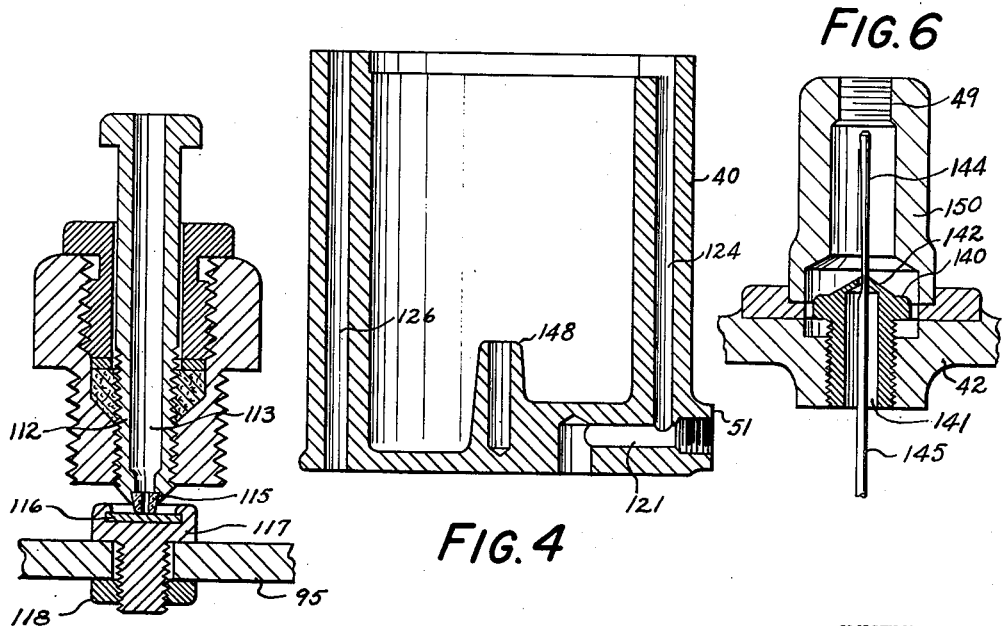
Fig. 4 is a section taken on a plane indicated by the line 4—4 of Fig. 2.
Fig. 5 is an enlarged sectional detail of the valve controlling the flow to the corrector.
Fig. 6 is a fragmentary section showing the means for varying the shunt orifice.

A preferred construction of the exit orifice is shown particularly in Fig. 6. A threaded plug fitting having a passage 141 leading therethrough is partially closed at the upper end by a conical wall 142, the opening through which is partially filled by an accurately ground and gradually tapered extension 144 of the vertical stem 145 on which the float F is rigidly secured. The lower end of this stem is loosely slidable in a guide indicated at 146, rising from the bottom of the member 40.

The conical upward slope of the wall 142, incidentally, has the effect of precluding moisture from gathering in the escape orifice or valve opening through which the extension 144 projects, as described.

Around the valve 140 is mounted a ring member supporting a housing 150 which may be transparent so that the condition and action of the upwardly extending member 144 of the by-pass valve may be observed, and to which the threaded end 61 of the pipe 60 is fitted.

The connection of the pipe 60 is shown as joining the exhaust connection 62 leading from the meter 70, and from which a pipe 63 may be led out-of-doors or into some exhaust stack. It is essential that the passages 55, 60, 62 and 63 be kept free from back pressures or Venturi action from any cause.

A suitable protecting hood or cap 64 may cover the end of the pipe 63, and it is preferably so shaped as to offer no resistance to escaping gas while assuring the free escape being unaffected by movement or air past the end of the pipe 63.

Summarizing the operation, gas entering the upstream tap 12 passes in relatively extremely small amount through the pipe 15, tube 80 and filter 82, to the chamber 32 passing through the master control orifice $O_2$ without measurable diminution in pressure and with substantially unhindered flow.

From the master control orifice gas passes from the upstream tap filling the chamber 27 above the diaphragm 90 and at a pressure precisely the same as that of downstream tap 14 in the main conduit. It will be borne in mind that the escape from this chamber is under control of pressure from the downstream side of the main orifice.

Passage of very small amount of gas is permitted through the control valve 110 and thence to the meter, while the action of the control valve and the amount of such passage is governed by the pressure maintained beneath the floating or liquid sealed diaphragm 90 from the downstream tap 14, passage 16, to the chamber 100, through the filter and chamber 101, through the passage 102 to the sealed under side of this diaphragm member 90. This member being balanced as described by the spring 97 will respond to any increase or unbalance of pressure above the diaphragm, which upon being thus depressed slightly permits what may be termed "precisely controlled leakage" through the valve 110.

As stated earlier, if known conditions within comparatively narrow limits obtained at all times in the main flow line, the passage of gas through the main control valve to the meter would afford a measurement within acceptable practical limits. However, inasmuch as proportional measurement is desired to be accomplished and accuracy attained in a wide variety of speeds of flow and ranges of pressure in the main flow line, the direct measurement of flow through the control valve is not sufficient, and needs to be corrected to compensate for the variations according to the Reynolds' factor.

The condition-responsive governing of the by-passing of the meter affords this correcting or compensating for the variation factors of wide ranges of orifices and pressures of the main line. If, for example, the pressure is high and the flow rapid, the proportional escape from the control valve to the chamber 120 is relatively high, then considerable allowance needs to be made, and, in fact, much computation would be required to determine from the meter readings any approximation of accurate measurement of flow in the main line. However, by reason of governing the height of the column of liquid supporting the float, and by predetermining the opening permitted between the tapered stem 144 and orifice of the by-pass valve 140, the correct proportional flow through the meter is effected. The slight back pressure of flow from the chamber 120 through the passage 126 partially counteracts the pressure in the annular space outside of the float chamber skirt 44, through the passage 124 and 125 on the liquid supporting the float by depressing the column inside of the float chamber, i. e., in the other leg of the balanced liquid column. This action further effects the control of the extent of opening at the by-pass valve 140, so that correction corresponding to Reynolds' factor computations is automatically effected.

If the differential between the upstream and downstream main line taps 12 and 14 is large, the flow is correspondingly rapid and the corrections according to Reynolds' factor tables would need to be relatively large, but the ratio or percentage of correction will be less.

As stated, the pressure existing at the downstream tap is maintained below the diaphragm and also in the space above it. Gas is released through the valve 110 at different rates of speed and approximately proportionate to the flow in the main line. If the flow through this valve 110 is above an average, the normally low pressure in the spaces 120 and 130 will be higher (by a water column measure of a fraction of an inch to perhaps two inches), and flow to the meter and also through the by-pass valve 140 will increase. The float will be lowered, which will inhibit this increase of escape through the by-pass valve. This lowers the percentage of the amount of gas being by-passed relative to that which is passing through the meter. This governs (reduces) the amount of gas, passed directly through the meter, in proportion to the conditions existing at both sides of the main line flow orifice.

Thus, the combination of the controller acting to allow a flow through the small orifice O₂ to maintain the exact same pressure as at the downstream side of the main line orifice, correspondingly governs a flow to the meter passage. If this flow tends to be very slight, substantially all of the escape through the valve 110 flows through the meter and is measured and passes to the open air.

If the controller responds to higher pressures and a greater differential between the taps in the main line, the corrector acts to by-pass (to the open air) larger amounts of gas proportional to the needed corrections for the fast flow condition then obtaining at the main line flow orifice.

Having thus described my invention, what I claim is:

1. In combination with a flow restricting orifice, a proportional flow measuring device including a meter and a connection thereto from the upstream side of the orifice, a valve in said connection, a diaphragm controlling flow through said valve to said meter and in response to downstream pressure, there being a conduit connecting the downstream side of said orifice with one side of said diaphragm, and a corrector between said valve and the meter including a by-pass around the meter, said corrector including a float-responsive valve for the by-pass acted upon by pressure in the passage leading to the meter.

2. The device defined in claim 1 in which the corrector further includes a manometer having fluid therein supporting the float for the float-responsive valve, one column of the manometer fluid being subjected to pressure of gas in the by-pass prior to its flow through the float-responsive valve, a conduit from the passage to the meter leading to the other column of the manometer fluid to subject the latter column to the pressure of the gas flowing to the meter, and whereby the corrector functions to maintain a constant, where the factor of main orifice flow is $$Q = C\sqrt{hP}$$

Q being quantity of flow, $h$ differential pressure, and P is barometer plus gauge pressure.

3. A metering device for measuring flow of liquid in a conduit, including a restricted orifice in the conduit, a tap at the upstream side of the restricted orifice, a meter and means providing a passage connecting the upstream tap with the meter, a valve controlling flow in the passage to the meter, means having a conduit connection with and responsive to pressure at the downstream side of said restricted orifice acting to control said valve, a corrector device having a shunt passage leading away from the passage leading to the meter and including a valve, and a manometer actuated by the pressure in the passage leading from said first mentioned valve to the meter, and means responsive to the manometer connected with and actuating said last-named valve.

4. A metering device for accurately integrating the factors of measure of the total flow in a main conduit by proportional measurement, and in which the main line conduit is provided with a restricted orifice element and a tap at each of the upstream and downstream sides of said restricted orifice, said device including a meter, means forming a passage leading from the upstream tap to the meter, a controller having a chamber and a diaphragm therein connected with the passage from the upstream tap to the meter, a conduit from the downstream tap to the controller chamber at the other side of the diaphragm, an element forming a minute orifice restricting flow from the upstream tap to the controller chamber, a valve governed by movement of the diaphragm controlling passage from the chamber toward the meter, an element forming a restricting corrector orifice element between said valve and the meter, a corrector responsive to variations in pressure between said valve and the meter and comprising means forming a vent passage to the open air from between said valve and the corrector orifice element, an escape valve in said vent passage controlling the flow of by-passed gas, and means responsive to pressure in said vent passage for actuating said escape valve whereby the amount of gas by-passed varies with the pressure flowing from said valve toward the meter.

5. The device described in claim 4 in which the means actuating the escape valve in the vent passage includes a manometer having one column of liquid subject to pressure in the vent passage between the diaphragm controlled valve and the vent passage escape valve, and the corrector having means forming a passage leading to the other liquid column of the manometer from a point between the corrector orifice element and the meter.

6. The device described in claim 4 in which the means responsive to pressure in said vent passage for actuating said escape valve includes a float and in which the escape valve in the vent passage comprises a minute orifice and a movable stem sliding therethrough as the float moves upwardly and downwardly.

7. The combination with a main line conduit having a restricted orifice forming means therein, taps positioned at the upstream and downstream side of the main orifice means and conduits leading from each of the taps, means forming a chamber having therein a dividing liquid sealed diaphragm and connected on one side of the diaphragm with the upstream tap conduit, and on the other side of the diaphragm with the downstream tap conduit, a meter and a conduit thereto from the chamber at the side of the diaphragm connected with the upstream tap, a minute orifice-forming element restricting passage of gas through the conduit connection from the upstream tap to the chamber, a valve in the conduit passage leading toward the meter from the chamber, and means governing the valve consequent upon movement of the diaphragm to allow controlled leakage through the valve while maintaining pressure equal to the pressure at the downstream tap, said liquid-sealed diaphragm having spring-balancing means, and said valve controlling the passage toward the meter comprising an adjustable bodily movable orifice, an arm pivoted to the diaphragm chamber means and extending toward the center of the diaphragm, a valve closure disk carried on the arm proportionably nearer its pivot and coacting with the valve orifice to control minute leakage from the diaphragm chamber to the meter in response to differential in pressure between the upstream and downstream taps of the main line.

8. A proportional metering device adapted to be connected to the upstream and downstream taps at restricted orifices in conduits, including a meter and a conduit forming a passage connected to the upstream tap, there being a chamber in said passage, a diaphragm responsive to pressure in the chamber, a valve in said passage permitting flow to the meter and governed by the position of the diaphragm, a connection with the downstream tap leading pressure to the opposite side of the diaphragm and tending to close said valve and acting to permit flow through the valve to maintain a pressure in said passage chamber equal to the pressure at the downstream tap, a by-pass between said valve and the meter, and a pressure-responsive means controlling said by-passing flow and having a conduit connecting said means to the by-pass, said by-pass pressure-responsive controlling means comprising a corrector having a valve orifice and tapered closure, a float connected with and acting to move said tapered closure to vary by-passing flow consequent upon variation of pressure between said first mentioned valve and the meter.

JOSEPH B. MERIAM.

REFERENCES CITED

The following references are of record in the file of this patent:

UNITED STATES PATENTS

| Number | Name | Date |
|---|---|---|
| 347,673 | Westinghouse | Aug. 17, 1886 |
| 475,596 | McDonald | May 24, 1892 |
| 2,044,806 | Naiman | June 23, 1936 |
| 2,207,840 | Tornquist | July 16, 1940 |
| 2,295,728 | Gess | Sept. 15, 1942 |